United States Patent [19]

Narendra et al.

[11] Patent Number: 4,855,822

[45] Date of Patent: Aug. 8, 1989

[54] HUMAN ENGINEERED REMOTE DRIVING SYSTEM

[75] Inventors: Patrenahalli M. Narendra, Edina; Karl M. Fant, Minneapolis; Carl P. Graf, Forest Lake, all of Minn.

[73] Assignee: Honeywell, Inc., Minneapolis, Minn.

[21] Appl. No.: 148,531

[22] Filed: Jan. 26, 1988

[51] Int. Cl.$^4$ ............................................... H04N 7/18
[52] U.S. Cl. ..................................... 358/103; 340/728; 358/105; 358/136; 364/424.02; 901/1; 901/46; 901/47
[58] Field of Search ...................... 358/103, 105, 136; 340/728; 364/424; 901/1, 46, 47

[56] References Cited

U.S. PATENT DOCUMENTS

| | | | |
|---|---|---|---|
| 3,557,304 | 1/1971 | Rue | 358/103 |
| 3,564,134 | 2/1971 | Rue | 358/103 |
| 3,962,537 | 6/1976 | Kearns | 358/109 |
| 4,018,405 | 4/1977 | Baker | 364/423 |
| 4,096,380 | 6/1978 | Eichweber | 358/109 |
| 4,405,943 | 9/1983 | Kanaly | 358/103 |
| 4,636,137 | 1/1987 | Lemelson | 901/46 |
| 4,645,459 | 2/1987 | Graf | 434/43 |
| 4,661,849 | 4/1987 | Hinman | 358/136 |
| 4,667,190 | 5/1987 | Fant | 340/727 |
| 4,682,225 | 7/1987 | Graham | 358/105 |
| 4,688,092 | 8/1987 | Kamel | 358/103 |
| 4,706,120 | 11/1987 | Slaughter | 358/103 |

Primary Examiner—Howard W. Britton
Attorney, Agent, or Firm—C. Lamont Whitham; Michael E. Whitham; W. Boswell Childs

[57] ABSTRACT

Methods and apparatus are provided for driving a vehicle from a remote control station achieving tele-operation of the vehicle. A television sensor mounted on the vehicle provides video image information which is reduced in bandwidth by a factor of approximately 1000:1 for transmission by narrow band RF data link to a remote control station. The large bandwidth reduction is accomplished by first sampling the video output of the sensor at a reduced frame rate and then compressing the data further by standard data compression techniques. Vehicle position and attitude data which may be derived from the vehicle's on board inertial reference unit are also transmitted via narrow band data link to the control station. At the control station, the data is first reconstructed by a technique which is the complement of the compression technique, and the instantaneous position and attitude data are used to compute transform coefficients that are used by a pipeline processor to extrapolate the frame data to generate a real time video display that enables an operator to drive the vehicle by transmitting appropriate control signals to the vehicle.

11 Claims, 5 Drawing Sheets

HUMAN ENGINEERED REMOTE DRIVING SYSTEM

CROSS REFERENCE TO RELATED APPLICATION

The subject matter of this application is related to copending application Ser. No. 06/788,652 filed Oct. 14, 1985, by Karl M. Fant and assigned to the assignee of this application. The disclosure of application Ser. No. 06/788,652 is incorporated herein by reference.

BACKGROUND OF THE INVENTION

Field of the Invention

The present invention generally relates to remotely controlled vehicles and, more particularly, to a system for transmitting video and motion data via a narrow band radio frequency (RF) data link for interactive tele-operation of robotic vehicles.

Description of the Prior Art

Remotely controlled vehicle systems using video information transmitted from a vehicle to a control station for tele-operation of the vehicle are described in U.S. Pat. Nos. 3,557,304 and 3,564,134 to Rue et al. 4,405,943 to Kanaly and 4,682,225 to Graham. Typically, such systems involve the control of a remote vehicle by an operator at a control station to which information regarding the vehicle's position, attitude and other operational parameters is displayed in real time so that the operator is able to respond with appropriate control signals to drive the vehicle. One or more television sensors mounted on the vehicle provides image data depicting the scene, that is, the operating environment of the remote vehicle, which data is transmitted by a communication link to the control station where the scene is displayed for the operator's reference. Control signals are returned to the vehicle by the operator providing interactive control of the vehicle. The control signals may require a separate link, as may the transmission of information regarding the operation of the remote vehicle.

In the remote control systems described in the patents to Rue et al., a wide angle lens is employed in a television camera mounted in the cockpit of the controlled vehicle and a hemispherical viewing screen is provided at the ground station. Additionally, in the later patent to Rue et al. mentioned above, a second television camera having a zoom lens is placed in the nose of the remotely controlled vehicle. No compression of the video information is performed in either one of the Rue et al. systems.

As is discussed in the patent to Kanaly, mentioned above, the transmission of high resolution video data from a television type sensor requires a wide band data link. Kanaly describes prior art systems in which occulometer equipment is employed to limit the portion of the scene being displayed as a high resolution image to that actually being observed by the operator. The occulometer senses the portion of the displayed scene being viewed and generates signals which are used on board the remote vehicle to limit the high resolution imaging of a scene to that being observed. The Kanaly patent itself discloses a system in which bandwidth is reduced without this control of the camera aboard the vehicle by imaging the entire field of the camera as high resolution data and digitizing and storing it on the vehicle. Occulometer equipment is used to extract from memory as high resolution data only that portion corresponding to the eye position of the operator as he views the display, the remainder of the image being transmitted from the vehicle as low resolution data constructed from the high resolution memory. In a second mode of operation, the occulometer control is removed and all of the data in memory is read out at a slower transmission rate and displayed as a fixed image at the control station.

Kanaly makes no attempt to either reduce the frame rate itself or compensate for a reduced bandwidth afforded by a reduction in the frame rate. The Kanaly approach to data compression is incapable of providing more than a 50:1 compression over conventional video without severely degrading the imagery presented to the operator, and falls far short of the 1000:1 compression afforded by the present invention.

Graham performs image compression based on a ranging laser sensor which measures the range rate to the objects being imaged. The Graham system performs image compression by sub-sampling a frame (or an image field), thereby blurring it. It adaptively reconstructs the image by superimposing the blurred frames to achieve a less blurred image if the sensor is not moving rapidly. Thus, it is only capable of approaching the high resolution in the reconstructed image when the sensor itself is relatively stationary as in the case of space applications for which it was intended. In high velocity applications like aerial and ground vehicles, this technique would result in continuously blurred imagery because the scene motion precludes the superimposition of several sub-sampled frames. Moreover, no reduction of the frame rate itself is proposed (nor the compensation thereof), and this limits the Graham system to not more than 32:1 compression, and even that would result in a severely degraded image in the case of rapidly moving sensors. In fact, the resultant image would be so blurred that it would be equivalent to a "myopia" of 20/700 compared with full bandwidth imagery.

Other prior art patents describing remotely controlled vehicles include U.S. Pat. Nos. 4,018,405 to Baker, 4,096,380 to Eichweber, and 4,636,137 to Lemelson. None of the systems described in these patents perform any kind of image compression. The patent to Baker shows a vehicle control system including a missile provided with a television camera that transmits images via a laser beam to a ground control station where they are displayed for an operator who generates control signals as necessary for transmission via the laser beam back to the vehicle for guidance. Eichweber also uses a laser beam, but of particular significance with respect to the invention disclosed herein is the discussion of the disadvantage of the use of optical fibers. Lemelson describes a different kind of robotic mechanism employing a television camera and short wave transmitters.

As noted above in connection with the discussion of the Kanaly patent, it will be further apparent from the description of the present invention that the transmission of video data via a narrow band RF data link and the displaying of the data at the control station to provide the instantaneous information required for the operator to close the control loop is an important aspect of this invention. In this regard, U.S. Pat. No. 3,962,537 to Kearns et al. discloses a reconnaissance system which includes a video RF link for transmitting optical image data from a camera carried in a gun launched projectile to a remote location. U.S. Pat. No. 4,661,849 to Hinman describes the transmission of a sequence of television camera images over a bandwidth-limited channel. The method employs a motion estimation process for estimation, for successive image frames, a measure of motion displacement between the images in the sequence. A navigation system is described in U.S. Pat. No. 4,688,092 to Kamel et al. in which images from a satellite camera are transmitted to an operations center on the ground where information is derived for orbit determination and satellite control.

As discussed in the Hinman patent, a number of bandwidth compression techniques are available for various applications, among them teleconferencing; however, such systems take advantage of the fact that major elements of a scene are not changing and transmit only those portions that have changed. Teleconferencing utilizes a stationary camera, while for remote control of a robotic vehicle, the camera is mounted on a moving vehicle.

The present invention makes use of computer image generation (CIG) and computer synthesized imagery (CSI) techniques for reconstructing a real time video image by warping a two dimensional image. The principle application area for CIG in the past has been that of visual training simulators which present scenes to an observer or trainee to allow the observer to practice some task, such as flying an airplane. In a flight simulator, a three-dimensional model of the desired "gaming area" is prepared and stored on magnetic disk or similar bulk storage media. This model is called the visual data base. The visual simulator combines an image generator with an electro-optical display system such as a cathode ray tube (CRT) or similar display. The image generator reads in blocks of three-dimensional data from the disk and transforms this data into two-dimensional scene descriptions. The two-dimensional data are converted to analog video that is presented to the operator or trainee via the display. The generated imagery is meant to be representative of the true scenes that the operator would see if the operator were actually performing the task being simulated. The generation of the display images is said to be in "real time" which is normally taken to mean 30 frames per second, as in the U.S. television standard. In order to achieve a real time display, pipelined processors are conventionally used in CIG systems. CIG systems are described in detail in the book entitled *Computer Image Generation* edited by Bruce J. Schacter and published by Wiley-Interscience (1983).

CSI technology also generates images such as, for example, video displayable images from a data base, but the objects and surfaces stored in the data base are represented as real-world electromagnetic media images of objects and surfaces rather than mathematical models thereof as in CIG. Thus, whereas CIG uses a computer to generate imagery from a purely mathematical data base, CSI uses a computer to insert objects into a scene based on stored real-world images. Although CIG provides excellent control of a scene to be constructed and displayed for interaction in an environment, the fidelity is low and thus realism in the displayed scene is poor. CSI is just the opposite; that is, fidelity is excellent, but the control over scene construction is restricted.

The technique employed by the invention is a merger of CIG and CSI technologies to form "Computer Generated Synthesized Imagery" (CGSI) as described in U.S. Pat. No. 4,645,459 to Carl P. Graf et al. As described in the Graf et al. patent, a scene is constructed by placing individual, normally detailed, objects with high fidelity (CSI) on a specified surface or background which may be CIG or CSI generated. A CGSI scene is constructed much in the manner of a CIG scene with the surface elevations and objects locations laid out in a uniform grid. The individual objects used in the scene are tailored for perspective, location and transformation including size position, rotation, warp and intensity are performed on each image as required. Like CIG systems, the principal application for CGSI technology has been in the are of visual training simulators wherein a display scene is composed and constructed from a library of images with sufficient processing speed to permit real time (30 Hz) presentation to the observer. Further information on the CGSI technique may be had with reference to U.S. Pat. No. 4,667,190 to Karl M. Fant and the above-referenced copending application Ser. No. 06/788,652 to Karl M. Fant.

SUMMARY OF THE INVENTION

It is therefore a principal object of the present invention to provide a system for the interactive, real time tele-operation of a robotic vehicle at high speeds.

It is another object of the invention to provide a communications link between a robotic vehicle and a remote operator which is hardened to electronic counter measures.

It is a further and more specific object of the invention to provide a highly optimized data compression system which makes possible narrow bandwidth television image data transmission while at the same time providing a high resolution video display of instantaneous position information for an operator of a robotic vehicle.

It is yet another object of the invention to provide a technique for performing a large ratio compression in excess of 1000:1 of video imagery to enable tele-operation of vehicles over a narrowband data link.

The tele-operation or remote control of robotic vehicles, as contrasted with the autonomous operation of such vehicles, requires a communications link that includes the operator as well as the vehicle. For such operation, a real time image of the scene of the vehicle operating environment as viewed by a sensor on the vehicle must be displayed to the operator, along with other vehicle operational data, and vehicle control signals must be transmitted to the vehicle. In addition, the communications or data link should be non-line-of-sight (NLOS) and, in the case of a hostile environment such as a battlefield, secure and hardened against electronic counter measures (ECM).

The real time display presented to the operator requires instantaneous feedback of vehicle position and attitude from a television camera mounted on the vehicle. The transmission of this data in digital form up to 64 million bits per second requires a wide band data link. Fiber optic data links offer sufficient bandwidth and are ECM hardened, but as suggested in Eichweber patent mentioned above, other problems are encountered including a lack of mechanical ruggedness, payout and retrieval, battlefield repairs and cost.

Narrow band RF data links with a capacity of less than 64 thousand bits per second are available in the battlefield environment and are NLOS secure and ECM hardened. However, conventional bandwidth compression techniques noted above fall far short of the approximately 1000:1 ratio required to compress the video bandwidth down to the bandwidth achievable in narrow band RF data links commonly used for telemetry.

According to the present invention, this problem is solved by the provision of a bandwidth compression system which reduces the video data from a television sensor to a narrow bandwidth which can be accommodated by an RF data link, thereby closing the loop around the driver of a tele-operated vehicle. Briefly described, "snapshots" of the vehicle's operating environment are obtained by sampling on board the vehicle. The video data from the television camera is therefore at a reduced frame rate, and this data is subjected to a further bandwidth compression using conventional techniques for transmission on an RF data link to the control station. Instantaneous vehicle position and attitude data are also derived from an inertial reference unit on the vehicle and are digitized for transmission over the same or another RF data link to the control station. At the control station, a real time image transformation device continuously transforms the last received frame information using the instantaneous position and attitude information to account for actual vehicle motion. The transformed video image is displayed for the operator and has the appearance of continuous video, with the received freeze-frame snapshot being extrapolated using the instantaneous vehicle position and attitude information until the next frame comes along. This allows the operator to interact by using the controls at his station to generate signals to drive the vehicle.

An important basic feature of the invention is the large reduction in bandwidth achieved. A reduction ratio in excess of 1000:1 is achieved by sampling the video at a frame rate of one frame every one to three seconds in contrast to the thirty frames per second standard for U.S. television and further subjecting the frame data to conventional bandwidth compression techniques providing a nominal additional 10:1 to 50:1 compression ratio. There exists a large number of well known techniques for bandwidth compression that rely on (1) time based recursive estimation, (2) transform based estimation of scene content such as Hadamard, Haar and Discrete Cosine Transform, (3) variable resolution based on where the "eye" is looking, as in the Kanaly patent, or (4) a hybrid technique based on a combination of the foregoing. Individually, these achieve compression ratios of up to 20:1 or at most 50:1 which is not sufficient for the purpose of this invention, although thy can be used in processing the data from sampled frames. This invention exploits the interframe data from the vehicle's inertial reference unit giving instantaneous position and attitude data to continuously transform the last received frame and provide a real time image of actual vehicle motion.

Another significant feature of the invention is the real time image transformation that is accomplished at the control station, after the data including scene and instantaneous vehicle position and attitude information is received via narrow band data link, which provides a continuous video type display including any perspective changes. At the control station, the compressed data is first reconstructed by a technique complementing that used on board the vehicle. Position and attitude data from the vehicle's on board navigation system are sent continuously to the narrow band receiver. A pipeline data processor performs the "warping" transformation that provides real time display at the remote control station. Image elements of the sampled frames, i.e., snapshots, are manipulated or "warped" in accordance with instantaneous position and attitude data. A pipeline controller oversees the transformation of snapshot data and the input of the next snapshot into the pipeline. The pipeline controller provides the interface which allows for a real time presentation of a continuous video display generated from a series of snapshots. To drive the vehicle, commands are executed by the operator resulting in changes in vehicle position and attitude. The changes are transmitted back to the control station where they are included in the display to continuously update the latter.

In an alternative form of the invention, a single frame image transmitted from the vehicle is presented in frozen frame form. Information as to position and attitude of the vehicle when the picture was taken and current position and attitude are used to construct a dynamic graphics overlay corresponding to shape and position of the vehicle is superimposed on the frozen frame presented to the operator. In this display, the vehicle form appears to move into the still frame, representing instantaneous vehicle position which the operator controls. The next still frame received at the control station replaces the old frame and the current position and attitude of the vehicle relative to the new frame is included in the display.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
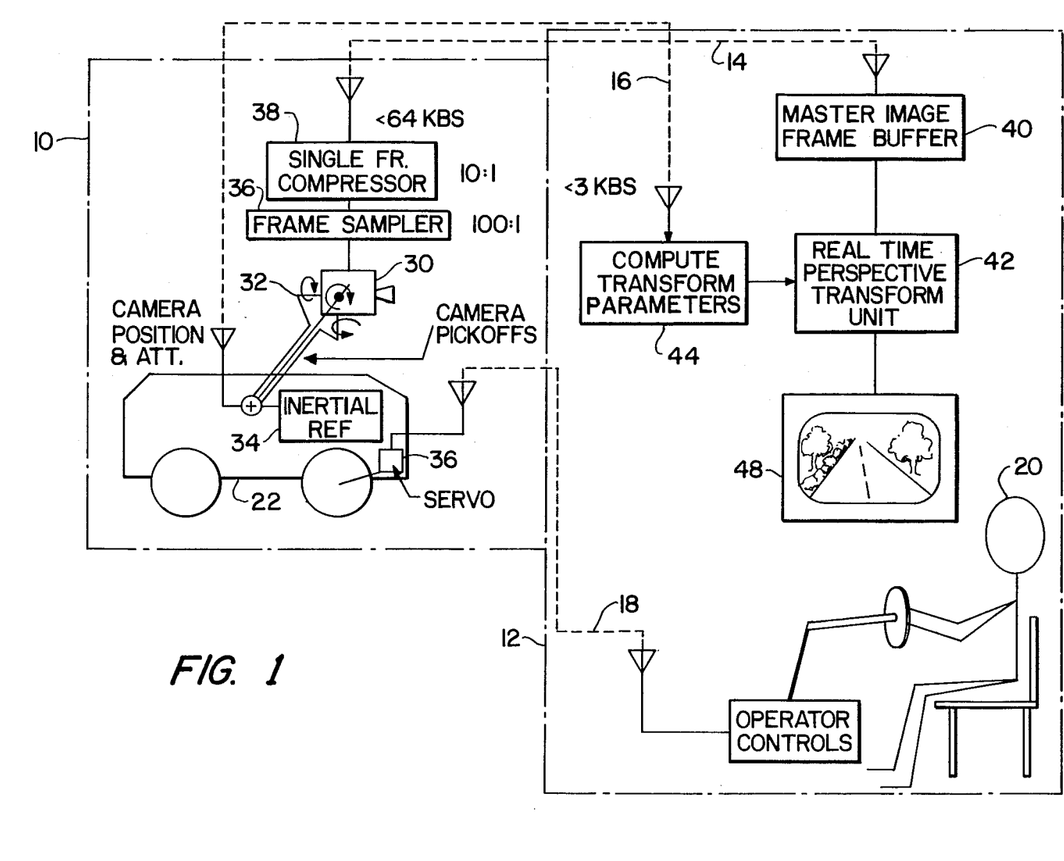
FIG. 1 is an illustration, largely conceptional and functional, showing the basic components of the remote drive system of the invention.

Referring now to the drawings, and more particularly to FIG. 1, the overall remote drive system is shown as consisting of two major components, namely, a vehicle and vehicle based equipment enclosed in dashed lines 10 and a control station enclosed in dashed lines 12. A number of narrow band RF links identified by numerals 14, 16 and 18 are shown which provide communications between the vehicle based equipment 10 and the control station 12. Three links are shown, one for each of the basic types of data being communicated between the components 10 and 12; namely, compressed bandwidth video data over link 14, instantaneous vehicle position and attitude data over link 16, and vehicle control data over link 18. Obviously, one narrow band link might suffice, or additional links could be used, if necessary. An operator 20 is shown whose task it is to interact with the data presented at the control station to drive a remote vehicle 22.

Vehicle 22 can be of any type; i.e., capable of moving on land or sea or in the air. For the sake of this description, the vehicle 22 is depicted as having wheels and therefore may be a land-based vehicle capable of traversing various types of terrain under the control of operator 20.

A television camera 30 is mounted on vehicle 22 at the highest possible point on the vehicle, taking into account clearance limitations. A charge coupled device (CCD) camera with fast electronic shuttering (1/100 to 1/2000 seconds) may be required to avoid blurring. If the camera 30 is mounted on a pan and tilt mechanism, pickoffs 32 are required to reference the camera 30 to an intertial reference unit 34 on the vehicle to provide exact camera position. The inertial reference unit 34 may be part of the internal control system on vehicle 22 or it may be required especially for this application. In any event, inertial reference unit 34 provides instantaneous position (x,y,z) and attitude (pitch, roll, yaw) data from vehicle 22 to control station 12 via narrow band RF link 16. Although this is real time data, that is a frame rate of 30 Hz as will be described in more detail hereinafter, it requires only low data rates because only six position and attitude numbers are needed to be transmitted every 30 milliseconds. The television camera video output can be in any convenient one of a number of well known analog or digital formats.

Other vehicle equipment is assumed to be on the vehicle 22 such as servos 36 which actuate various parts of the driving gear on the vehicle upon receipt in proper form of control signals from the operator 20 via communications link 18. In addition, various operational data is fed back to control station 12 via this link.

Unique to the requirements of this invention is the single frame sampler 36 which samples the video from television camera 30 at a low rate of, for example, one frame every one to three seconds as contrasted with the standard 30 frames per second rate, providing snapshots rather than a continuous video output. In computer graphics systems, the sampler 36 is referred to as a frame "grabber". There are many such frame grabbers available commercially. The snapshots from the single frame sampler 36 are further subjected to a conventional bandwidth reduction techniques by single frame compressor 38 to provide a total combined bandwidth reduction in excess of 1000:1.

This reduced bandwidth image data is transmitted via narrow band RF data link 14 to frame buffer 40 at the control station 12. Frame buffer 40 performs double buffering so that a new snapshot image can be received as the previously received frame is being fed to real time transform unit 42. Instantaneous vehicle position and attitude information is continuously transmitted via the same or a separate narrow band data link 16 to transform computer 44 which uses this data to compute the coefficients (parameters) necessary for transforming the single frame image, or snapshot, into real time video images. The transform coefficients (parameters) are supplied to real time perspective transform unit 42 which performs the actual transformation. The transform computer 44 and real time perspective transform unit 42 comprise a pipeline processor that computes in real time perspective images from the snapshots of scene images of the vehicle's operating environment. Pipeline processors and perspective scene image generation are discussed in more detail in U.S. Pat. Nos. 4,645,459 to Graf et al. and 4,667,190 to Fant and U.S. patent application Ser. No. 06/788,652 to Fant mentioned above. The real time images, including perspective changes, are presented to operator 20 at display 48. This display presents images that have the appearance of continuous video by extrapolating between snapshots using vehicle, i.e., camera, position and attitude information.

Figure 2:
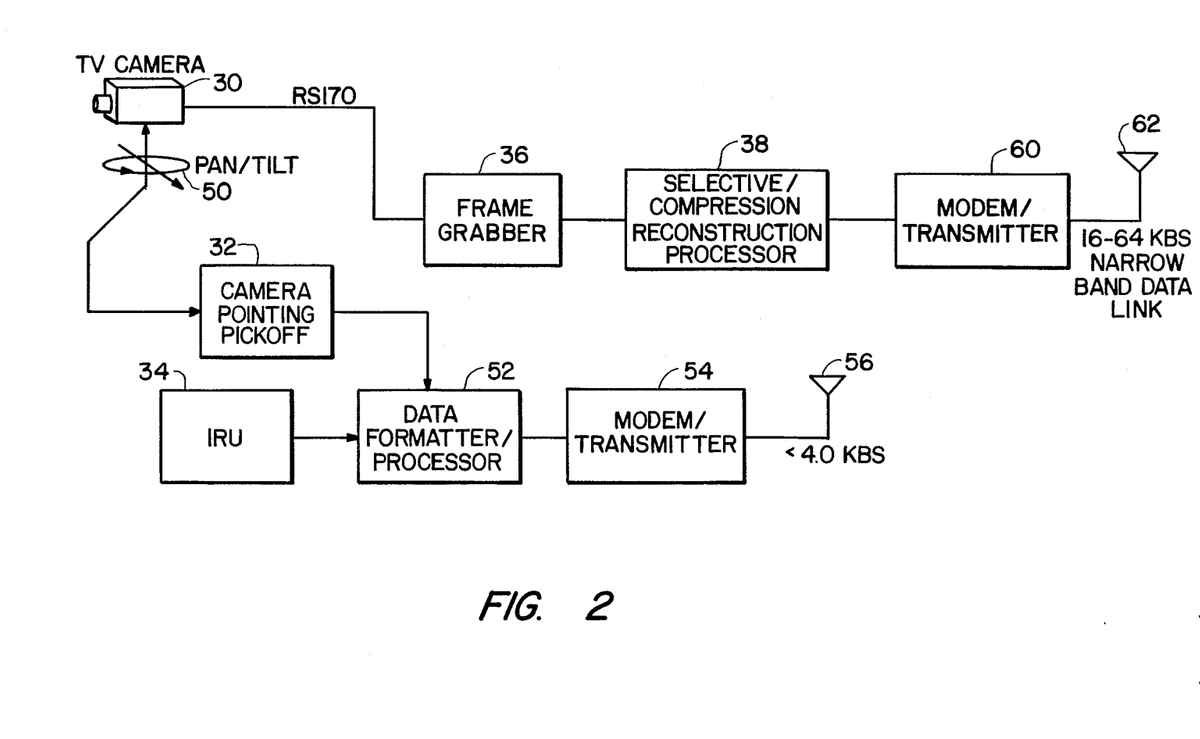
FIG. 2, is a block diagram showing the components of the system which are mounted on the remote vehicle.
Figure 3:
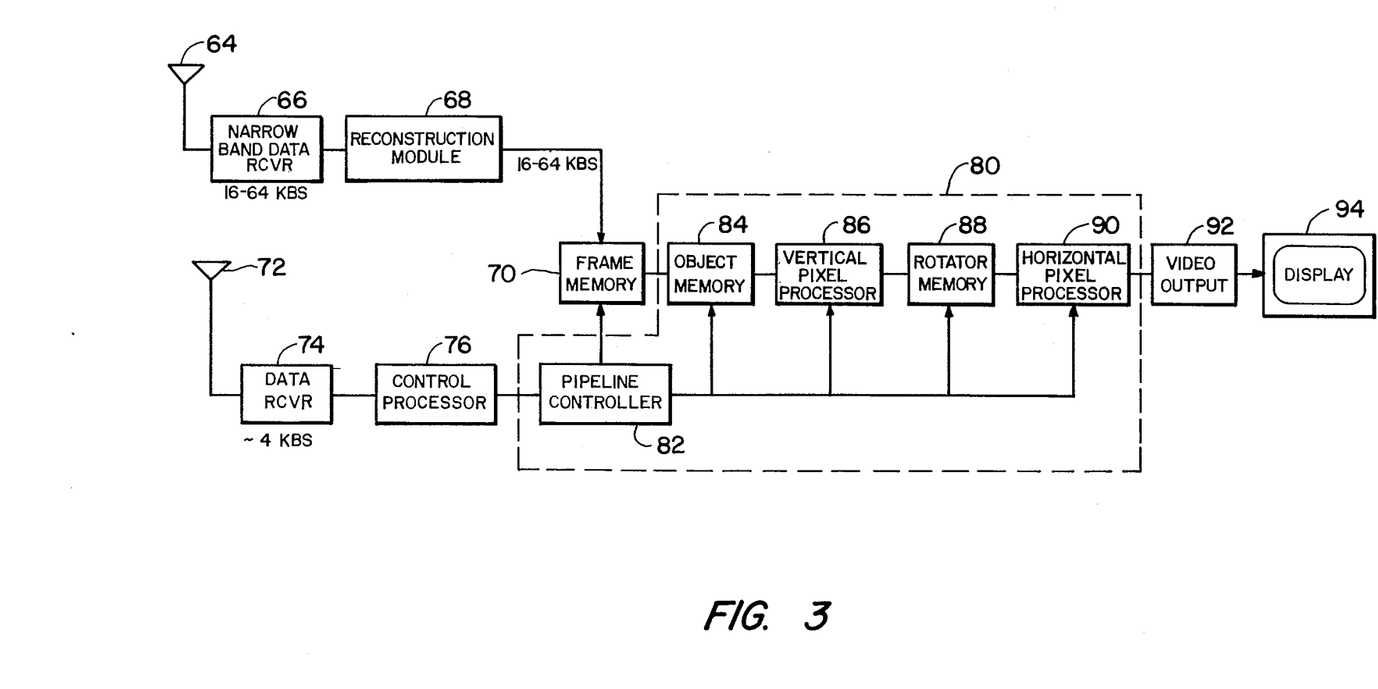
FIG. 3 is a block diagram of the system components which are located at the control station.

FIGS. 2 and 3 show the vehicle on board equipment and the control station, respectively, in more detail. In FIG. 2, television camera 30 is shown mounted on a pan and tilt mechanism 50 for motion independent of the vehicle 22 platform. The latter may receive commands from the operator 20 at control station 12. Camera pointing pickoffs 32 provide signals regarding camera 30 position and attitude to a data formatter/processor 52 which also accepts position and attitude information from inertial reference unit 34 on board vehicle 22. Vehicle position and attitude information is measured by the inertial reference unit 34 at the frame rate of television camera 30. In processor 52, vehicle position and attitude information is combined with camera pointing information and formatted for transmission by transmitter 54 and antenna 56.

The video output from television camera 30 is fed to frame grabber 36 which samples the video at a reduced frame rate. The image data in the sampled frame (i.e., the snapshots) are further compressed in bandwidth compression unit 38 utilizing standard bandwidth compression techniques such as adaptive delta pulse code modulation (ADPCM), discrete cosine transform or a hybrid technique to further reduce the bit rate to 16 to 64 thousand bits per second. The compressed video is supplied to transmitter unit 60 and antenna 62 for transmission to the control station 12.

At control station 12, as shown in FIG. 3, receiving antenna 64 provides signals to narrow band data receiver 66. A reconstruction module 68, which is the complement of the compression processor 38 on the vehicle 22, is connected to receiver 66. Module 68 reconstructs the single frames from the received compressed video data by employing a bandwidth reconstruction technique which is the complement of the compression technique employed by bandwidth compression unit 38 on the vehicle. The reconstructed single frames are fed to frame memory 70 which performs multiple buffering so that a new frame can be accepted from reconstruction module 68 while the previous frame is being read out to a pipeline processor generally indicated by reference numeral 80, which will be described in more detail hereinafter.

The position and attitude data transmitted from the vehicle 22 is also received at the control station 12. The same receiving equipment may be used at the control station for both the video data and the position and attitude data. However, for this description, a separate receiving antenna 72 and data receiving unit 74 are shown. Antenna 72 and receiver 74 may also be the receiving end of a transceiver or part of a communication interface already provided in a robotic vehicle to feed back information on vehicle position and other operating conditions, such as for example odometer, speedometer and other such gauge readings.

The position and attitude data are fed from receiver 74 to a control processor 76 which, in addition to interfacing with the receiver, transforms the data into the parameters required by a pipeline controller 82 in pipeline processor 80 to perform the perspective transformation into real time images of the single frame data from memory 70. Control processor 76 thus outputs to pipeline controller 82 the control points of the transformation which the pipeline controller needs to compute the scan line warp coefficients required by the pipeline processor 80. Control processor 76 also controls frame rates for transformation and sequences the pipeline controller 82 to move the frame through the successive stages of the pipeline process.

The pipeline controller 82, as is typical, provides clock signals for input of the image frames from frame memory 70 to the pipeline processor 80 as well as reading them out of memories associated with the various stages of the pipeline processor. It also computes the scan line "warp" coefficients on a scan line by scan line basis to implement the entire algorithm to provide the transformation from frame data to real time images having the desired perspective. To implement the transformation, the pipeline processor comprises an object memory 84 feeding a vertical processor 86, which is a pixel processor, in turn feeding a rotator memory 88 which performs the scan line conversion. The output from the rotator memory 88 is read out to a horizontal processor 90, which is a pixel processor.

The output of pipeline processor 80 is frame-by-frame image data transformed to real time and is in digital form. Video output unit 92 performs a digital-to-analog conversion and reinserts the requisite synchronizing and blanking control signals so that the real time video image data can be presented on a conventional CRT display 94. The information thus provided is used by operator 20 located at control station 12 to drive and otherwise control remote vehicle 22. Of course, many variations may be used in the bandwidth compression, reconstruction and transformation of the frame or snapshot image data within the scope of the invention as well as the communication of the data between the vehicle 22 and the control station 12.

Figure 4:
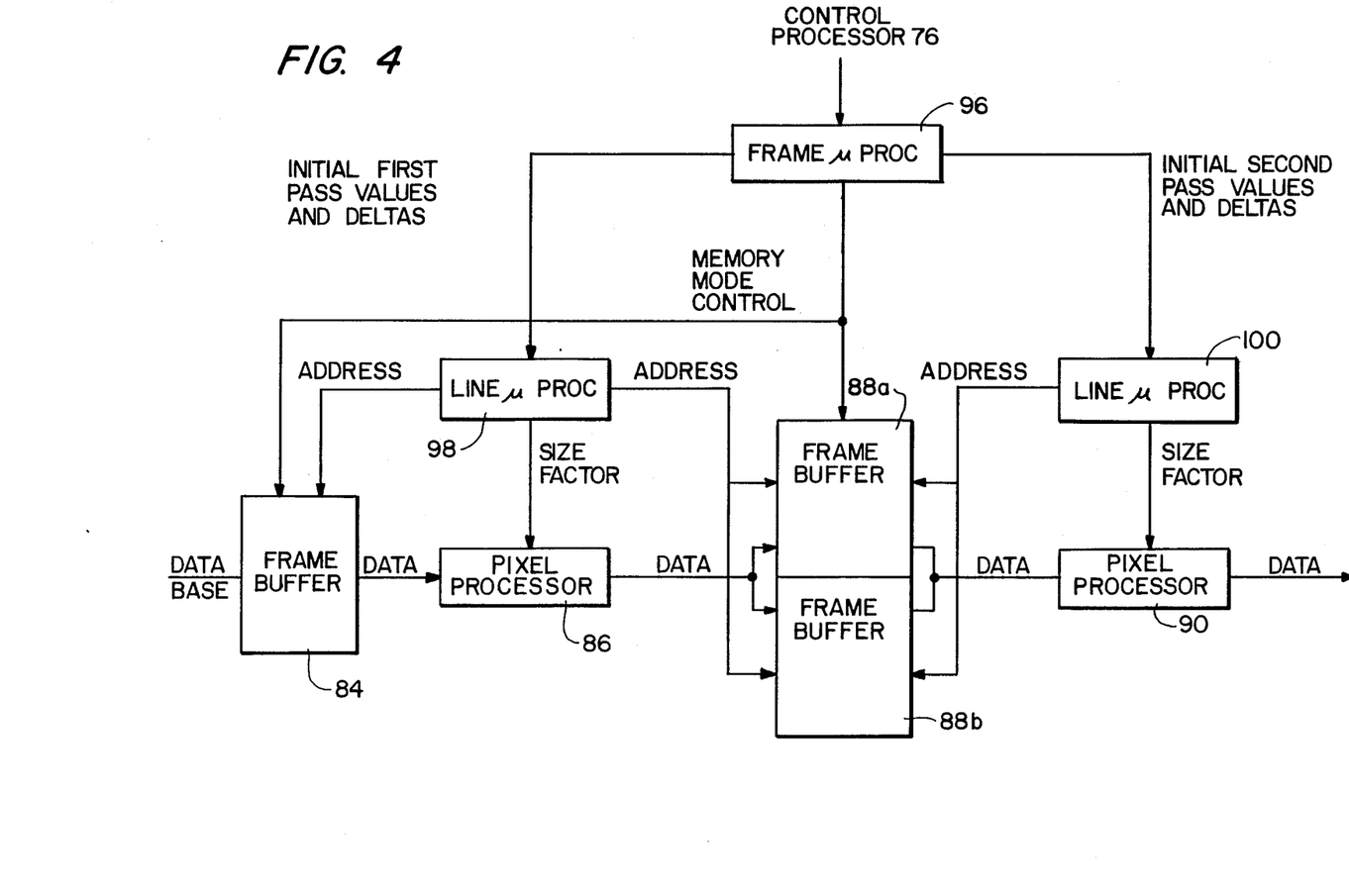
FIG. 4 is general functional block diagram of the pipeline warp processor which is part of the system shown in FIG. 3.

FIG. 4 shows the general functional blocks of the pipeline warp process. The function of the warp processor is to (1) reconstruct the real-time video from the compressed video data that has been transmitted across the data link to the image warp processor, and (2) warp this image into the correct perspective based upon the current inertial data. The pipeline is capable of performing any arbitrary perspective transformation. The data comes into the frame buffer or object memory 84. A frame microprocessor 96, which is part of the pipeline controller 82, receives warp image transform parameters from control processor 76 and supplies a memory mode control to the frame buffer 84, and a line microprocessor 98, also part of the pipeline controller 82, supplies an address to the frame buffer 84 in response to initial first pass values and deltas (i.e., changes in values) from microprocessor 96. Data from the frame buffer 84 is read out to a vertical processor, which is the pixel processor 86. The pixel processor 86 operates under the control of the line microprocessor 98 which provides a size factor input. The resulting data from the pixel processor 86 is alternately written into one or the other of frame buffers 88a or 88b, which constitute the rotator memory 88. The addresses in the frame buffers 88a and 88b, where the data are written, are generated by the line microprocessor 98, and the frame microprocessor 96 also provides a memory mode control to the frame buffers 88a and 88b. As data is being written into one of the frame buffers 88a or 88b under the control of line microprocessor 98, data is being read out of one of the frame buffers 88b or 88a under the control of line microprocessor 100, also part of the pipeline controller 82. Line microprocessor 100 receives initial second pass values and deltas from the frame microprocessor 96 and generates addresses for the frame buffers 88a and 88b and a size factor input for a horizontal processor, which is the pixel processor 90.

As may be appreciated from the foregoing description, the control and processing inside the warp pipeline processor naturally partitions into three hierarchical stages, namely, the frame, line and pixel stages. The frame and line processing is low bandwidth than pixel processing and can be accomplished with available 16-bit microprocessors, such as the Motorola 68000. The pixel processing is very high data rate and requires custom designed hardware. This hardware is described in detail in U.S. Pat. No. 4,645,459 to Graf et al., for example, to which the reader is referred for further details.

Figure 5:
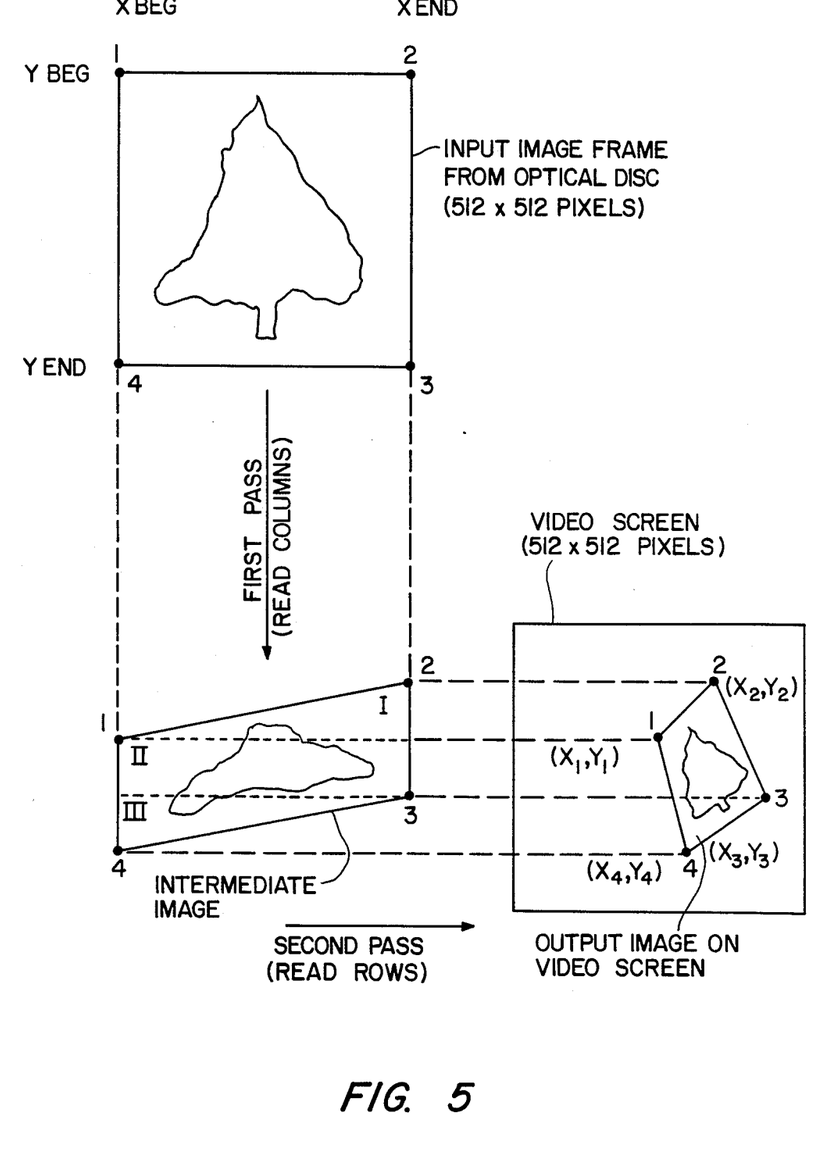
FIG. 5 is a pictorial illustration of the warping process performed by the pipeline warp processor.

The frame level control involves setting up the memories, communicating with the control processor 76 and initiating the line processors. Several computation tasks are carried out at the frame level. On the first pass, the vertical orientation is determined as indicated by the intermediate image shown in FIG. 5. On the second pass, the horizontal orientation of this intermediate image is determined to generate the resulting image on the video screen. The warp image processor continuously warps the last frame received as a function of the difference between the vehicle's current location (determined from navigational data transmitted to the control station 12 from the vehicle 10) and the vehicle's location when the image was acquired. The algorithm that is implemented is as follows:

1) Check if a new image has arrived (images arrive every three seconds). If an entire new image has arrived, go to 2, otherwise go to 3.

2) Establish the inertial coordinates of four control points of the image in order to define the warp mapping for this and subsequent frames (image plane locations for these points may be selected manually by the operator or automatically).

3) Derive the warp mapping as a function of the vehicle's current location.

4) Warp the image.

The control or warp image processor 76, shown in FIG. 3, sends its control parameters to the pipeline controller 82. The pipeline controller 82 requires as input the control points of the transformation which is used to computer the scan line warp coefficients required by the pipeline architecture. The primary function of the pipeline controller 82 is to implement the warp algorithm which defines the perspective transformation of a planar patch of image data. The patch to be transformed is rectangular and is specified by the coordinates of the four corners of the patch in the two-dimensional image plane. The locations of the patch in three dimensions (after perspective transformation) is specified by the coordinates of the corners of the projected image of the patch on the two-dimensional image. These two sets of coordinates for the four corners of the patch define the perspective transformation uniquely.

As applied to the subject invention, the four corner locations for the planar patch before transformation could be the four corners of the image. Thus, the four coordinates for the four corners of the planar patch are obtained by calculating where rays from each of the four corners to the lens center intersect the image plane. A more appropriate set of corner points may be those points which cause minimal distortion in the warped imagery for nominal driving conditions of the vehicle. These corner or control point locations can be identified by subjective evaluation of the image quality for various choices for the control point locations.

The mapping performed by the warping algorithm defines the new image plane locations for the control points exactly. It is only approximately correct for the remaining points of the image plane. However, if the control points are chosen intelligently, the mapping will be nearly exact for the true corners of the fixed image. Therefore, the coordinate locations that define the warp transformation can be the original corners of the fixed image and the approximate locations of these corners, obtained by the bi-affine transformation.

An alternative embodiment of the invention uses vehicle position and attitude information in a manner different from the transformation described above. Instead of warping single frame images, they are presented in frozen frame form. The vehicle's position and attitude information when the frozen frame image was made and its instantaneous position and attitude are both available at the control station. This information is used to construct a dynamic graphical overlay of the vehicle which is superimposed on the frozen frame presented to the operator. A display is provided in which the vehicle appears to move into the still frame, representing instantaneous vehicle position and enabling the operator to control the vehicle. The next still frame received replaces the old still frame and the current position of the vehicle is represented relative to the new frame being displayed. Thus, although the entire viewpoint of frozen frames changes, the relative position of the vehicle does not, and continuous operator control is possible. The implementation of this embodiment is possible using known three-dimensional graphic systems capable of rendering frame models at real time and near real time rates. However, this form of the invention does not use a conventional continuous video display at the man-machine interface and may require the operator to perform additional tasks.

While the invention has been described in terms of a preferred embodiment, those skilled in the art will recognize that the invention can be practiced with modification within the spirit and scope of the appended claims.

Having thus described our invention, what we claim as new and desire to secure by Letters Patent is as follows:

1. A system for driving from a remote control station a vehicle comprising:
   a sensor on the vehicle for providing snapshot images from the vehicle of an environment in which the vehicle is operating;
   motion detecting means on the vehicle for providing information describing the motion of the vehicle;
   transmitting means on the vehicle for transmitting the snapshot images and the information describing the motion of the vehicle to the remote control station; and
   image generation means at the remote control station for combining the snapshot images and the information describing the motion of the vehicle into a display that can be utilized for driving the vehicle from the remote control station.

2. The system as recited in claim 1 wherein the motion detecting means includes an inertial reference unit supplying vehicle position and attitude data.

3. The system as recited in claim 2 wherein the sensor is a television camera mounted on the vehicle further comprising a pan and tilt mechanism on which the camera is mounted, the pan and tilt mechanism being referenced to said inertial reference unit for providing instantaneous position and attitude data.

4. The system recited in claim 1 wherein the transmitting means includes a narrow band communications link.

5. The system as recited in claim 4 wherein the sensor includes a television camera providing a video output.

6. The system as recited in claim 5 wherein the transmitting means includes data compression means for compressing the video output for transmission by the narrow band communication link.

7. The system as recited in claim 6 wherein the data compression means includes sampling means for sampling the video output to provide frame-by-frame images for transmission.

8. The system as recited in claim 7 wherein the data compression means includes means for compressing the video data in the frame images.

9. A system for driving a vehicle from a remote control station comprising:
   a television sensor on the vehicle for providing video images from the vehicle of an environment in which the vehicle is operating;
   sampling means on the vehicle for sampling the video images at a reduced frame rate, thereby providing video image data at a reduced bandwidth;
   data compression means on the vehicle for further reducing the bandwidth of the video image data;
   inertial means on the vehicle for providing instantaneous vehicle position and attitude data at a low data rate for transmission to the control station;
   a narrow band radio frequency data link for transmitting the reduced bandwidth video data and low data rate position and attitude data to the control station;
   receiving means at the control station for receiving the reduced bandwidth video data and low data rate position and attitude data transmitted from the vehicle;
   decompression means at the control station for reproducing the video images at the reduced frame rate;
   memory means at the control station for temporarily storing the reproduced video images;
   coefficient generation means at the control station for receiving the low data rate position and attitude data and computing the coefficients required to transform images in said memory means into real time video images;
   image generation means responsive to said coefficients for transforming images in said memory means into real time video images; and
   display means for displaying the real time video images to assist an operator in remotely controlling the vehicle.

10. A method for driving a vehicle from a remote control station comprising the steps of:
    sensing images from the vehicle at a low frame rate to produce a series of snapshots of an environment in which the vehicle is operating;
    determining the instantaneous position and attitude of the vehicle;
    transmitting the snapshots and position and attitude to the remote control station;
    temporarily storing the snapshots at the remote control station and extrapolating between snapshots based on the vehicle position and attitude to generate a continuous real time image of the vehicle environment; and displaying the continuous real time image to assist an operator in controlling the vehicle.

11. A method for transmitting and receiving video data in a television format comprising the steps of:

sampling video data from a camera at a reduced frame rate;

sensing instantaneous position and attitude information of the camera;

using the instantaneous position and attitude information to extrapolate between sampled video data to generate real time video image data; and displaying the generate real time video image data.

* * * * *